(No Model.)

D. PARKER.
ATTACHMENT FOR CULTIVATORS.

No. 554,087.    Patented Feb. 4, 1896.

Witnesses.
Dave D. Bicknell.
Stephen H. Phillips.

Inventor.
Daniel Parker

UNITED STATES PATENT OFFICE.

DANIEL PARKER, OF PENFIELD, ILLINOIS.

ATTACHMENT FOR CULTIVATORS.

SPECIFICATION forming part of Letters Patent No. 554,087, dated February 4, 1896.

Application filed November 30, 1894. Serial No. 530,509. (No model.)

*To all whom it may concern:*

Be it known that I, DANIEL PARKER, a citizen of the United States, residing at Penfield, in the county of Champaign, in the State of Illinois, have invented a new and useful Gopher Attachment for Cultivators, of which the following is a specification.

My invention relates to the improvement of implements used in the cultivation of corn and other cereals planted in rows; and the purpose of the invention is to provide an implement in the use of which the benefits of both the usual cultivator and gopher are attained. I attain these objects by the mechanism illustrated in the accompanying drawings, in which—

Figure 1:
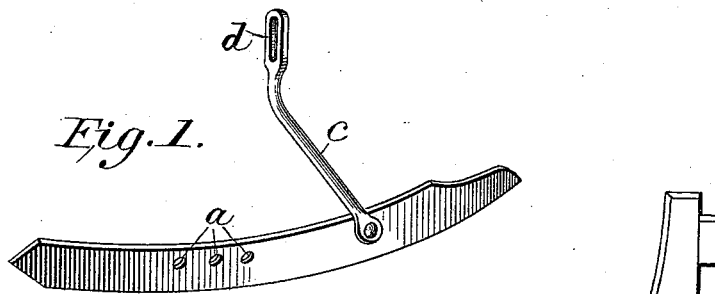
Figure 2:
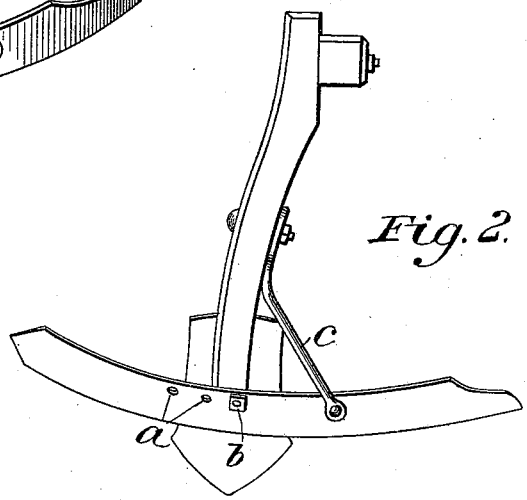
Figure 3:
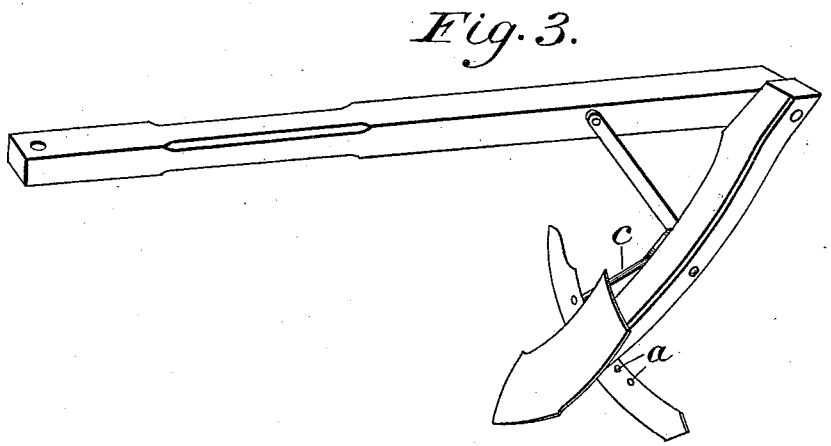

Figure 1 is a view of the gopher attachment itself. Fig. 2 is a back view of the attachment in position on the implement ready for use. Fig. 3 is a front view of the gopher attachment in position on the implement ready for use.

Similar letters refer to similar parts throughout the several views.

The gopher attachment, Fig. 1, consists of a slightly-curved blade or shovel, made of iron or steel, of such dimensions as may be best suited to the character of the work to be done; but for practical use in the cultivation of corn it should be about two feet in length and about two and one-half inches wide, with pointed and sloping ends, substantially as shown at Fig. 1. The lower edge of this blade or shovel should be sharpened through its entire length. Near the center of the blade or shovel are three or more bolt-holes, $a\ a\ a$, by which it is to be attached to the back part of the shovel-standard by a bolt $b$. This bolt may be the same bolt by which the cultivator-shovel is attached to the beam, if desired. The object of the several bolt-holes in the blade or shovel is to enable the operator to so adjust the blade or shovel as to bring it nearer to or farther from the cereal to be cultivated, as may be desired. About half-way between these holes and the end of the blade or shovel is fixed an upright brace $c$, made of iron, securely fastened thereto by a bolt, which may be either fixed or adjusted by a tap. In the top of this brace is a slot $d$. This brace is to be attached at its upper end to the shovel-standard by a bolt in order to retain the blade or shovel in a fixed position. The object of the slot in the upper end of the brace is to enable the operator to raise or lower the point of the blade or shovel.

I am aware that prior to my invention gopher blades or shovels have been used in the construction of gopher-cultivators and to supply the place of cultivator-shovels on cultivators themselves; but I am not aware that any implement has ever been invented in which the cultivator-shovel and gopher blade or shovel have been attached to the same shovel-standard at the same time in order to obtain the benefits of a combined cultivator and gopher in the same implement.

What I do claim for my invention, and desire to secure by Letters Patent, is—

In a cultivator, the combination, with the shovel and standard, of a curved blade provided near its center with a series of bolt-holes, and midway between said bolt-holes and one of its ends, with a pivoted brace having a slotted upper end, as described, a bolt connecting the shovel and curved blade with the standard, and a bolt connecting the slotted end of the brace and standard, substantially as and for the purpose set forth.

DANIEL PARKER.

Witnesses:
A. L. PARKER,
M. H. CLOUD.